United States Patent [19]
Callanan

[11] Patent Number: 5,933,342
[45] Date of Patent: Aug. 3, 1999

[54] RECTIFIER WITH ALTERNATIVE PATH FOR FREEWHEELING CURRENT

[75] Inventor: Robert Joseph Callanan, Colorado Springs, Colo.

[73] Assignee: Ford Motor Company, Dearborn, Mich.

[21] Appl. No.: 09/089,609

[22] Filed: Jun. 2, 1998

[51] Int. Cl.⁶ .................................................. H02M 7/06
[52] U.S. Cl. ............................................ 363/126; 363/34
[58] Field of Search .......................... 363/34, 124, 125, 363/126

[56] References Cited

U.S. PATENT DOCUMENTS

| | | | |
|---|---|---|---|
| 4,271,462 | 6/1981 | Peters | 363/84 |
| 4,412,278 | 10/1983 | Cambier et al. | 363/126 |
| 4,805,082 | 2/1989 | Heinrich et al. | 363/129 |
| 5,329,439 | 7/1994 | Borojevic et al. | 363/87 |
| 5,331,534 | 7/1994 | Suzuki et al. | 363/34 X |
| 5,345,164 | 9/1994 | Lesea | 323/208 |
| 5,535,085 | 7/1996 | Tanaka et al. | 363/50 X |
| 5,684,683 | 11/1997 | Divan et al. | 363/65 |
| 5,764,496 | 6/1998 | Sato et al. | 363/37 |

*Primary Examiner*—Peter S. Wong
*Assistant Examiner*—Y. J. Han
*Attorney, Agent, or Firm*—Mark S. Sparschu

[57] ABSTRACT

A rectification circuit comprises a diode full-wave bridge rectifier, a freewheeling current path and a blocking diode coupled between the rectifier and the freewheeling current path to cause freewheeling current of the bridge rectifier to at least partially flow through the freewheeling current path instead of through the diodes of the bridge rectifier. A result is reduced "reverse recovery" power dissipation in the rectifier diodes.

9 Claims, 1 Drawing Sheet ically used in such an application. Lower voltage diodes typically have better reverse recovery characteristics, further reducing reverse recovery power dissipation.

RECTIFIER WITH ALTERNATIVE PATH FOR FREEWHEELING CURRENT

BACKGROUND OF THE INVENTION

1. Field of the Invention

The present invention relates to AC/DC rectifiers.

2. Description of the Related Art

In a typical "buck derived" full-bridge DC/DC converter, the DC input is chopped into a pulse-width modulated AC signal which is then voltage-converted by a transformer. The output of the transformer is then rectified by a full-wave diode bridge rectifier.

In such a design, a concern about the durability of the rectifier diodes can arise. During an "active" portion of the waveform being provided to the rectifier, two diodes conduct and two are in a blocking state. However, when the waveform is in a "dead" portion of its PWM cycle, all four diodes "freewheel" because current continues to flow to the load. That freewheeling current flows through all four diodes of the rectifier bridge. When the waveform enters an "active" portion again, two of the diodes become reverse-biased and must "commutate" to blocking mode. When a diode commutates to blocking mode, the charge within the diode must be expelled from the diode. The charge leaves in the form of a temporary flow of reverse current through the diode. This reverse current causes, in combination with the reverse voltage applied across the diode, "reverse recovery" power dissipation.

It has been observed that the recovery power dissipation can be significant enough to not only be energy-wasteful, but also to be destructive to the bridge rectifier diodes. In a particular DC/DC converter application in an electric vehicle, the reverse recovery power has been measured at a peak value of up to three kilowatts. Where the switching frequency of the converter is high, this amount of power dissipation can cause destructive heating of the diodes.

Therefore, a system which can reduce the reverse recovery power dissipation in the bridge rectifier diodes can improve their durability and thereby provide advantages over the prior art.

SUMMARY OF THE INVENTION

The present invention provides a rectification circuit comprising a diode full-wave bridge rectifier, a freewheeling current path and blocking means coupled between the rectifier and the freewheeling current path for causing freewheeling current of the bridge rectifier to substantially flow through the freewheeling current path.

In another embodiment, the present invention provides a rectification circuit comprising a diode full-wave bridge rectifier, a freewheeling current path and a blocking diode coupled between the rectifier and the freewheeling current path to cause freewheeling current of the bridge rectifier to at least partially flow through the freewheeling current path.

The present invention also provides a rectification circuit comprising an electrical load, a plurality of first diodes coupled across a first node and a second node in a bridge rectifier configuration, at least one second diode coupled between the first node and a third node and a third diode coupled between the second node and the third node.

Designs according to the present invention can limit recovery power dissipation in bridge rectifier diodes to a very acceptable level. In doing so, the present invention can improve the durability of the diodes and thereby provide advantages over the prior art.

DETAILED DESCRIPTION OF THE PREFERRED EMBODIMENT

Figure 1:
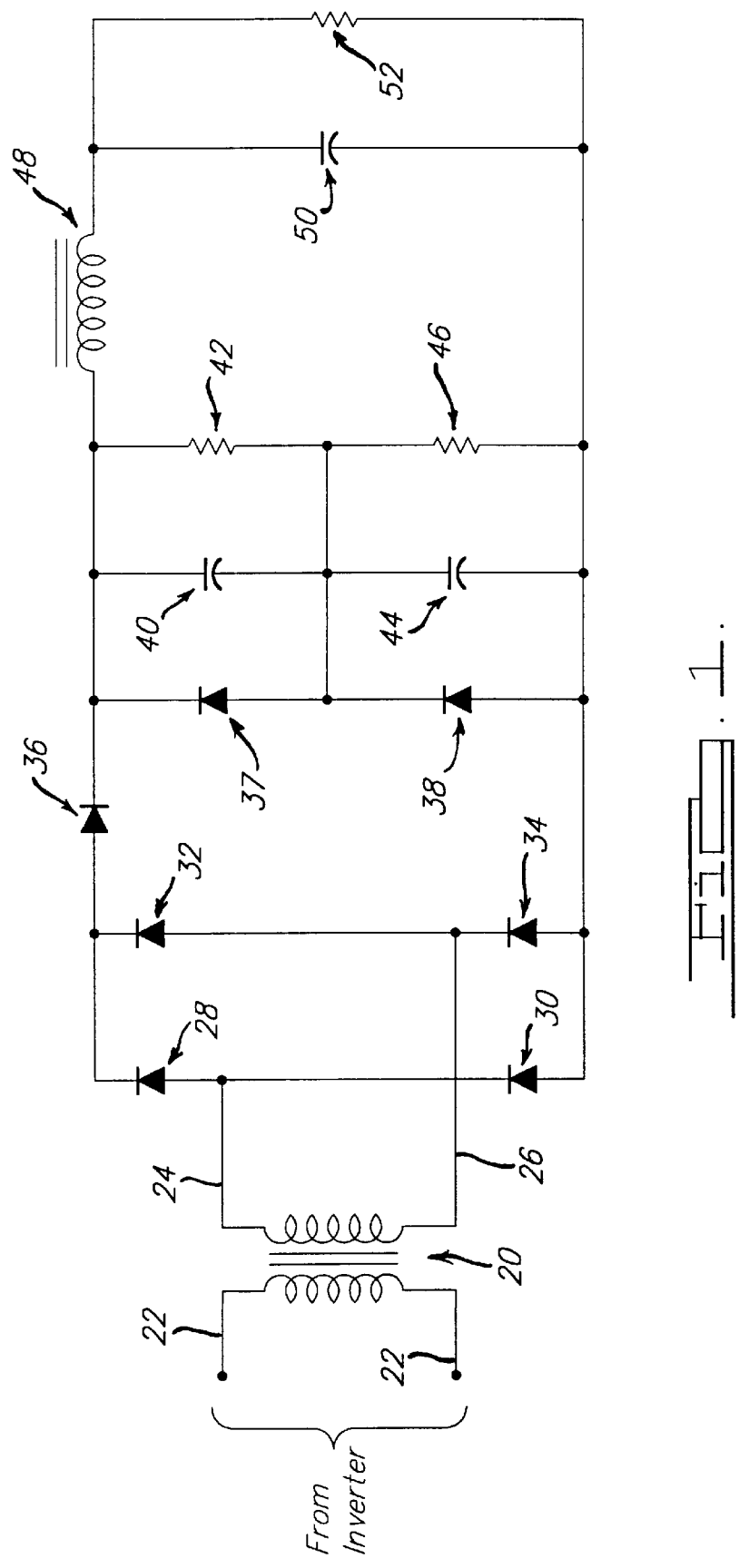
FIG. 1 is a schematic diagram of a DC/DC converter embodying a rectifier according to the present invention.

Refer first to FIG. 1. The DC/DC converter illustrated there includes a transformer 20 having input terminals 22 connected to a pulse-width-modulated voltage source such as an inverter. Transformer 20 has outputs 24 and 26. Coupled to outputs 24 and 26 in a typical full-wave bridge rectifier configuration are diodes 28, 20, 32 and 34.

Diode 36 is also provided between bridge rectifier diodes 28, 30, 32 and 34 and diodes 37 and 38. Coupled across diode 37 is a capacitor 40 and resistor 42; coupled across diode 38 is a capacitor 44 and resistor 46.

An output L-C filter comprising choke 48 and filter capacitor 50 filters the output voltage of the DC/DC converter for use by electrical load(s) 52.

The circuit of FIG. 1 operates as follows. When output 24 of transformer 20 is high with respect to output 26, diodes 28 and 34 conduct. Diodes 30 and 32 are reverse biased and block current flow. When the waveform from transformer 20 then enters a "dead" part of its PWM cycle, the voltage across outputs 24 and 26 is zero. However, due to the inductance of choke 48, current continues to flow to load(s) 52. This "freewheeling current" returns from load 52 and flows predominately through diodes 37 and 38. The freewheeling current is substantially blocked from flowing through bridge rectifier diodes 28, 30, 32 and 34 by the additional diode drop provided by diode 36. That is, for freewheeling current to flow through the bridge rectifier diodes, the current would flow through oaths comprising three diodes (either diodes 28, 30 and 36 or diodes 32, 34 and 36). Freewheeling current will tend to flow through the path comprising only two diode drops, the path comprising diodes 37 and 38.

When the waveform from transformer 20 then enters an "active" portion where output 26 is high compared to output 24, diodes 28 and 34 must commutate to "blocking" mode. However, two consequences of the present invention prevent high "reverse recovery" power dissipation in diodes 28 and 34. First, the very small freewheeling current flowing through diodes 28 and 34 means that only a small reverse current will flow during recovery. Further, because a very substantial freewheeling current is flowing through diodes 37 and 38, those diodes clamp the reverse voltage across the bridge diodes until the bridge diodes have recovered. The result is much less reverse recovery power dissipated in diodes 28 and 34. Whereas with a conventional design, peak recovery power in the bridge rectifier diodes was measured at three kilowatts, the peak recovery power in the bridge rectifier diodes of the FIG. 1 design has been measured at only between 100 and 200 watts.

Recovery power in freewheeling diodes 37 and 38 is limited as well. Capacitors 40 and 44 limit the rate at which reverse voltage can rise across diodes 37 and 38. Thus, although a significant reverse current flows through diodes 37 and 38 during commutation, the reverse current is not in phase with the reverse voltage. As a result, reverse recovery power dissipation in diodes 37 and 38 is very low. Measurements indicate that the peak reverse recovery power dissipation is below 250 watts.

The use of a series combination of two diodes 37 and 38 also allows lower voltage diodes to be used (600 volts) than the 1200 volt diodes used in the bridge rectifier. In practice, the lower-voltage diodes have been shown to be more robust during recovery that the higher voltage fast recovery epitaxial diodes. Resistors 42 and 46 and capacitors 40 and 44 help to effect a balancing of voltage between diodes 37 and 38.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A rectification circuit comprising:

a diode full-wave bridge rectifier;

a freewheeling current path comprising at least one, but not more than two, freewheeling diodes coupled substantially across said bridge rectifier;

blocking means coupled between said rectifier and said freewheeling current path for causing freewheeling current of said bridge rectifier to substantially flow through said freewheeling current path.

2. A rectification circuit as recited in claim 1, wherein said blocking means comprises a diode.

3. A rectification circuit as recited in claim 1, further comprising at least one capacitor, each said capacitor coupled across a respective one of said at least one, but not more than two, freewheeling diodes.

4. A rectification circuit as recited in claim 1, further comprising at least one filtering circuit, each said filtering circuit coupled to a respective one of said at least one, but not more than two, freewheeling diodes to limit the rate of rise of reverse voltage across said at least one, but not more than two, freewheeling diodes.

5. A rectification circuit comprising:

a diode full-wave bridge rectifier;

a freewheeling current path comprising at least one, but not more than two, freewheeling diodes coupled substantially across said bridge rectifier;

a blocking diode coupled between said rectifier and said freewheeling current path to cause freewheeling current of said bridge rectifier to at least partially flow through said freewheeling current path.

6. A rectification circuit as recited in claim 5, further comprising at least one capacitor, each said capacitor coupled across a respective one of said at least one, but not more than two, freewheeling diodes.

7. A rectification circuit as recited in claim 5, further comprising at least one filtering circuit, each said filtering circuit coupled to a respective one of said at least one, but not more than two, freewheeling diodes to limit the rates of rise of reverse voltage across said at least one, but not more than two, freewheeling diodes.

8. A rectification circuit comprising:

an electrical load;

a plurality of first diodes coupled across a first node and a second node in a bridge rectifier configuration;

at least one second diode coupled between said first node and a third node; and a third diode coupled between said second node and said third node;

wherein said third diode is connected in order to:

allow current rectified by said first diodes to flow to said load; and prevent at least some freewheeling current flowing through said load from flowing through said first diodes and instead cause said at least some freewheeling current to flow through said at least one second diode.

9. A rectification circuit as recited in claim 8, further comprising at least one filtering circuit, each said filtering circuit coupled to a respective one of said at least one second diode to limit the rates of rise of reverse voltage across said at least one second diode.

* * * * *